(12) United States Patent
Schomacker et al.

(10) Patent No.: US 12,203,451 B2
(45) Date of Patent: Jan. 21, 2025

(54) RELATING TO WIND TURBINE MAINTENANCE

(71) Applicant: Vestas Wind Systems A/S, Aarhus N. (DK)

(72) Inventors: Jonas Lerche Schomacker, Solrød Strand (DK); Torben Ladegaard Baun, Skødstrup (DK); Niels Vinther Voigt, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 444 days.

(21) Appl. No.: 17/251,320

(22) PCT Filed: May 29, 2019

(86) PCT No.: PCT/DK2019/050169
§ 371 (c)(1),
(2) Date: Dec. 11, 2020

(87) PCT Pub. No.: WO2020/001714
PCT Pub. Date: Jan. 2, 2020

(65) Prior Publication Data
US 2021/0254604 A1 Aug. 19, 2021

(30) Foreign Application Priority Data

Jun. 25, 2018 (DK) .......................... PA 2018 70434

(51) Int. Cl.
*F03D 80/50* (2016.01)
*A62C 3/16* (2006.01)
(Continued)

(52) U.S. Cl.
CPC ............... *F03D 80/50* (2016.05); *A62C 3/16* (2013.01); *B64D 1/08* (2013.01); *B64D 1/16* (2013.01);
(Continued)

(58) Field of Classification Search
CPC ......... F03D 80/50; A62C 3/16; B64C 39/024; B64D 1/08; B64D 1/16; B64D 1/22;
(Continued)

(56) References Cited

U.S. PATENT DOCUMENTS 9,650,136 B1 5/2017 Haskin et al.
10,023,323 B1 * 7/2018 Roberts ................. B64C 39/024
(Continued)

FOREIGN PATENT DOCUMENTS

CN 207523826 U 6/2018
DE 202015105415 U1 10/2015
(Continued)

OTHER PUBLICATIONS

Danish Patent and Trademark Office, Search and Examination Report in PA 2018 70434, Dec. 5, 2018.
(Continued)

*Primary Examiner* — Peter D Nolan
*Assistant Examiner* — Roy Rhee
(74) *Attorney, Agent, or Firm* — Wood Herron & Evans LLP

(57) ABSTRACT

A method for carrying out a maintenance operation on a wind turbine, comprising: stationing a maintenance vehicle proximal to the wind turbine, initiating a maintenance operation on the wind turbine, deploying a UAV from the maintenance vehicle, wherein the UAV has a payload including a rescue package, positioning the UAV such that the rescue package is placed on the wind turbine. A system is also provided.

27 Claims, 4 Drawing Sheets

(51) Int. Cl.
*B64D 1/08* (2006.01)
*B64D 1/16* (2006.01)
*B64D 1/22* (2006.01)
*B64U 10/13* (2023.01)
*G05D 1/00* (2006.01)
*B64U 80/86* (2023.01)
*B64U 101/26* (2023.01)
*B64U 101/57* (2023.01)

(52) U.S. Cl.
CPC .............. *B64D 1/22* (2013.01); *G05D 1/101* (2013.01); *B64U 10/13* (2023.01); *B64U 80/86* (2023.01); *B64U 2101/26* (2023.01); *B64U 2101/57* (2023.01); *B64U 2201/20* (2023.01)

(58) Field of Classification Search
CPC .... G05D 1/101; B64U 10/13; B64U 2201/20; B64U 80/86; B64U 2101/00
See application file for complete search history.

(56) References Cited

U.S. PATENT DOCUMENTS

| | | | |
|---|---|---|---|
| 2012/0136630 A1* | 5/2012 | Murphy | F03D 17/00 702/188 |
| 2016/0340006 A1 | 11/2016 | Tang | |
| 2017/0115667 A1 | 4/2017 | Marr et al. | |
| 2019/0060679 A1* | 2/2019 | Kim | A62B 1/22 |
| 2019/0301192 A1* | 10/2019 | Merrild | B60L 53/67 |
| 2021/0254604 A1* | 8/2021 | Schomacker | B64D 1/22 |

FOREIGN PATENT DOCUMENTS

| | | | |
|---|---|---|---|
| EP | 3305658 A1 * | 4/2018 | ............ A62C 27/00 |
| GB | 2556644 A | 6/2018 | |
| KR | 20180066376 A | 6/2018 | |
| WO | 2007009464 A1 | 1/2007 | |
| WO | 2017110743 A1 | 6/2017 | |

OTHER PUBLICATIONS

European Patent Office, International Search Report and Written Opinion in PCT Application No. PCT/DK2019050169, Aug. 27, 2019.

Japanese Intellectual Property Office, Notice of Reasons for Refusal issued in corresponding Japanese Patent Application No. 2020-572699 (with English machine translation), dated Dec. 23, 2022.

European Patent Office, Examination Report issued in European Patent Application No. 19728574.5, dated Feb. 1, 2023.

China National Intellectual Property Administration, office action issued in corresponding Chinese Application No. 201980042385.9, dated Apr. 28, 2023.

Japanese Patent Office, Second Examination Report issued in corresponding JP Application No. 2020-572699, dated Jul. 5, 2021.

* cited by examiner

RELATING TO WIND TURBINE MAINTENANCE

TECHNICAL FIELD

This invention relates to methods and systems to improve maintenance procedures of wind turbines, particularly with a view to improving the safety of crew involved in those maintenance procedures.

BACKGROUND

An important factor underlying the commercial viability of wind turbine installations is the need to reduce the overall cost of energy. Therefore, wind turbine manufacturers strive continuously to reduce the cost of wind turbine equipment, to improve reliability of that equipment to reduce turbine downtime, and to reduce the cost of installation.

In addition to the installation cost of a wind power plant, there is the also the ongoing cost of maintenance. With the increased move to offshore installations, maintenance costs are pushed higher as access to the power plants becomes more problematic. Whilst it is important to reduce the cost of maintenance, it is crucial to ensure the safety of the personnel involved in maintenance operations. Maintenance crews therefore must be suitably certified for the work that they are doing and are required to follow carefully formulated maintenance procedures in order to reduce the risk of accidents to a minimum. As a precaution, it is currently standard fitment for wind turbines to be equipped with a rescue package, providing such equipment as fire-resistant clothing, breathing equipment, fire-fighting equipment; offshore survival suits, climbing equipment and so on. Such rescue packages provide the maintenance crew with a variety of equipment to deal with the unlikely event of an accident. However, such equipment is expensive, and providing a rescue package to every wind turbine in a wind park is a significant cost. Added to this is the fact that rescue packages may need to be re-certified one or more times per year. Such certification tasks may require a separate visit to the wind turbine which, in an offshore environment particularly, is a significant undertaking.

It is against this background that the invention has been devised.

SUMMARY OF THE INVENTION

According to one aspect of the invention, there is provided a method for carrying out a maintenance operation on a wind turbine, comprising: stationing a maintenance vehicle proximal to the wind turbine, initiating a maintenance operation on the wind turbine, deploying a UAV from the maintenance vehicle, wherein the UAV has a payload including a rescue package, positioning the UAV such that the rescue package is placed on the wind turbine.

As a result of the invention, the rescue package is provided to the wind turbine on an 'on-demand' basis, only when a maintenance operation is ongoing. This avoids the need to provide a rescue package as a standard item of equipment on each wind turbine, therefore achieving a significant cost reduction. Furthermore, due to the typical certification requirements associated with rescue packages, providing a rescue package on-demand in this manner avoids the need to create a separate site visit to re-certify a rescue package since any re-certification can be done on the maintenance vehicle as and when required. A further benefit is that the rescue package could be expanded as required to include more equipment, or the equipment within the rescue package could be tailored to a particular environment in which the wind turbine to be maintained is located.

In order to provide maintenance personnel with ready access to the rescue package, preferably the UAV is positioned or controlled to land on the wind turbine so as to place the rescue package at a predetermined access point on the wind turbine. That access point may be on the nacelle since that is usually the most accessible point on the wind turbine, and where most maintenance tasks are carried out. The predetermined access point is proximate to a hatchway of the nacelle to ensure that the rescue package is particularly easy and quick to access by maintenance personnel during an emergency.

The UAV may be deployed from the maintenance vehicle in response to initiation of the maintenance operation. Alternatively, the UAV may be deployed from the maintenance vehicle in response to an emergency notification, signal, message or call.

In one embodiment, the UAV is controlled to return to the maintenance vehicle immediately after the rescue package has been placed on the wind turbine. Thus, in this scenario, the UAV may be controlled to retrieve the rescue package from the wind turbine once the maintenance operation is completed. Beneficially, in this situation the UAV can drop off the rescue package at the wind turbine and then return to the base vehicle where it can be made available to carry out further missions. For example, the UAV may be controlled to take rescue packages to other wind turbines that require maintenance.

In an alternative embodiment the UAV may remain with the rescue package during the maintenance operation and return the rescue package to the maintenance vehicle after the maintenance operation has been completed.

The rescue package may comprise one or more of an offshore survival suit, a defibrillator kit, climbing equipment, safety descent kit, fire extinguisher, breathing equipment, first aid package, fire protection clothing, and nutrition packages.

In another aspect, the invention relates to a system for carrying out a maintenance operation on a wind turbine comprising: a maintenance vehicle carrying a UAV with an associated payload comprising a rescue package, and a control station configured to: deploy the UAV before or during a maintenance operation, direct the UAV to a wind turbine on which the maintenance is carried out, and position the UAV with respect to the wind turbine so that the rescue package is placed thereon.

DETAILED DESCRIPTION

Embodiments of the invention provide unmanned aircraft systems (UAS) and unmanned air vehicles (UAV) or drones, in order to provide an improved approach to carrying out maintenance operations on wind turbines.

For brevity, this discussion will refer to a 'drone' as any type of unmanned air vehicle, be it a relatively small-scale rotorcraft such as a multirotor, for example a tricopter, quadcopter, pentacopter, hexacopter, octocopter or a larger-scale unmanned helicopter.

The embodiments of the invention provide a novel approach for improving maintenance operations for wind turbines. The invention permits a rescue package to be provided on an 'on-demand' basis from a maintenance vehicle that is in near to the wind turbine during a maintenance operation, such that the rescue package can be delivered to the wind turbine only when the maintenance operation is ongoing. Such a vehicle may be a Service Operations Vessel in the context of an offshore wind park. One benefit of the invention is that the maintenance vehicle is able to provide a rescue package to the wind turbine that is undergoing maintenance, which avoids the need for each wind turbine to be equipped with a dedicated rescue package, which greatly reduces cost.

A further benefit is that since the rescue package is located on the maintenance vehicle when not in use, which means that the rescue package can be inspected and re-certified at any time. This is to be contrasted with the existing situation in which specific site visits must be performed in order to re-certify a rescue package in situ on a wind turbine. The invention therefore enables a significant reduction in operational cost to the wind turbine operator.

Figure 1:
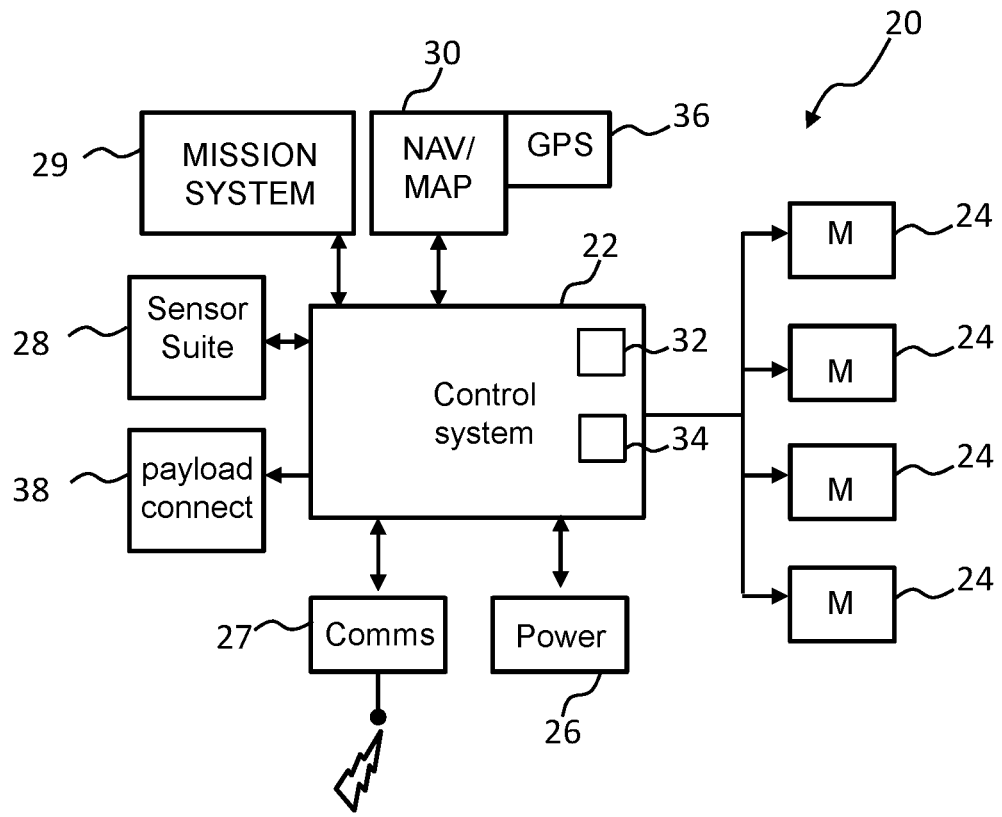
FIG. 1 is a schematic diagram of an exemplary unmanned air vehicle system for use in the embodiments of the invention.

To put the invention into context, FIG. 1 illustrates a system diagram of a typical architecture of a UAV/drone 20 which may be used in the implementation of the embodiments of the invention. In overview, the drone 20 includes: a control system 22, one or more propulsion units 24, a power system 26, a communication system 27, a sensor suite 28, mission planning system 29 and a navigation system 30. The drone system 20 may be operated in conjunction with a ground-based or remote computer system 31, hereinafter referred to as the 'control station', which will be described in more detail later with reference to FIG. 2.

The control system 22 is the main computing unit that controls the flight of the drone 20 by controlling the propulsion units 24 based on inputs from the sensor suite 28 and navigation system 30. The control system 22 may implement remote control flight based on received control inputs from the control station, autonomous flight, based on its internal mission planning algorithms, or semi-autonomous flight, in which a blend of on-board mission planning and ground-based direction are used. The main responsibility of the control system 22 is as a lower layer controller which is responsible for positional control of the drone (altitude and lateral position), attitude control (pitch, roll and yaw), and velocity control (horizontal and vertical speed) based on remote control actions or based on self-generated flight directions. The control system 22 comprises a suitable processing environment having a processor 32 and a memory 34 with associated on-board communications functionality, such as a data bus, so it is able to communicate with other on-board systems.

To directly control the flight profile the control system 22 communicates with the one or more propulsion units 24. Four propulsion units 24 are shown here, as would be consistent with the drone system 20 being a multirotor. However, more or fewer propulsion units are also appropriate. For example an autonomous helicopter may have a single propulsion unit, but heavy lift drones may have six or eight propulsion units. The propulsion units may be any suitable units for providing controllable flight for the drone, and may be electric motors driving suitable rotor blades, as are typical with multirotor of varying size and lift capacities. However, the propulsion units 24 may also be gas turbines or internal combustion engines, for example.

The on-board power system 26 is selected to be suitable for the propulsion units 24. For example, for electric motors the on-board power system 26 may be a battery pack, a fuel cell, or even an external power plug so as to receive electrical power from an external source. Conversely, the power system 26 could be an on-board fuel tank in the event that the propulsion units are gas-turbines or ICEs.

The communication system 27 provides the means to send and receive data to and from systems that are external to the drone 20. For example, the drone 20 may send telemetry data to the control station 31, and may send positional, attitude and velocity data to other drones operating in the area, either as part of a drone swarm or operated independently. The communication system 27 may also receive data from external systems, and in this context it may receive remote control commands from the control station 31 if the drone 20 is operated in remote control flight mode. Alternatively it may upload mission data from the control station 31. The communication system 27 may also permit incoming and outgoing communication with other drones so that flight paths and mission objectives can be coordinated with them to achieve a collective goal. The communication system may direct signals by any means known in the art including, but not limited to, cellular or other phone-based networks, over remote control radio frequency links, UHF or L-band frequency links, microwave frequency links, or other appropriate datalinks, networks, or communication paths.

The sensor suite 28 is operably connected to the control system 22 and provides appropriate sensor data to assist with the operation of the drone. For example, the sensor suite 28 may comprise proximity detectors, a satellite based positioning system, including for example differential GPS, RTK-GNSS, PPP-GNSS or any other local positioning system set up for positioning control, optical still and video cameras for carrying out inspection and guidance tasks, inertial navigation systems to name a few examples. Typically such a sensor suite 28 would be adaptable to carry more or fewer sensors as required for a particular task. Note that in this context the GPS unit may receive signals directly from satellites in order to fix the position of the drone, although another option would be to implement a differential GPS system (known in the art) which receives signals from a ground-based differential GPS beacon in order to provide a higher positional accuracy compared to direct GPS. Note that a GPS unit 36 is shown here as integral with the navigation system 30.

Mission planning system 29 provides a link to the control station 31 to store missions that have been generated on it and to which the drone follows in use. The mission planning system 29 may include suitable memory storage and algorithms to store, provide and generate on the fly appropriate mission objectives, waypoints, operational envelopes and so on.

Navigation system 30 provides control inputs to the flight control system 22 regarding path following based on input from GPS data from the sensor suite 28.

In addition to the systems described above, the drone 20 also includes a mounting means 38 for the mounting of a payload, as will be described in greater detail below.

The mounting means 38 may be configured to hold or support a payload, such as a rescue package. Such a payload may be held in a fixed position relative to a main body of the drone 20 or, in alternative embodiments, the payload may be suspended from the drone by a flexible line, tether or sling. To provide flexibility over the type of payload that is carried, the mounting means 38 may be configured to releasably attach the payload to the drone 20, such that the payload may be removed or replaced after use.

Figure 2:
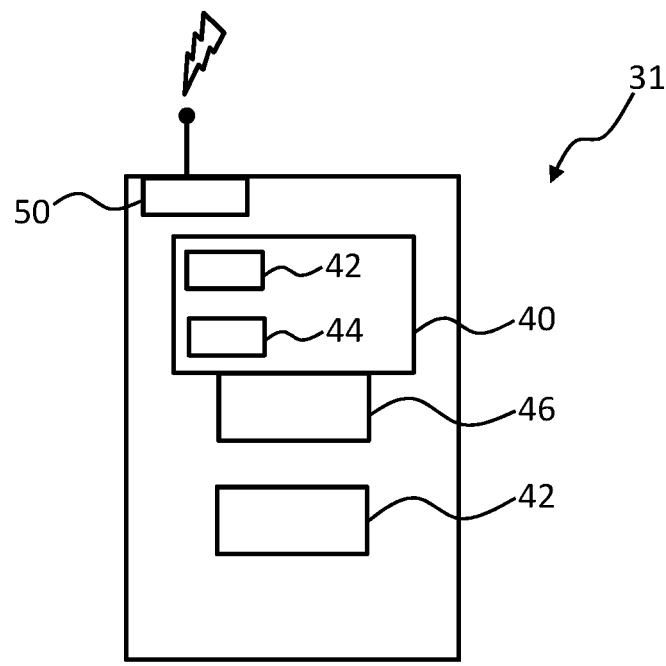
FIG. 2 is a schematic diagram of a control station for use with the unmanned air vehicle system of FIG. 1.

Having described the functional components of the drone 20, discussion will now turn to the control station 31 as shown in FIG. 2. The control station 31 provides a control hub for one or more drones 20 as described above and is suitably equipped with a computing platform 40 having an appropriate processing module 42 and memory storage 44. The computing platform 40 implements a suitable control station software package 46 to provide appropriate control station facilities for controlling and coordinating the drone, together with other drones if necessary. For example, the software package may include telemetry feeds, status information updates, first person visual (FPV) feeds, mission planning interfaces and algorithms and so on. A user interface 48 is provided to enable to a user/operator to view data relating to the drone 20 and to input control and parameter data into the control station 31. The user interface 48 may comprise a display screen, audio output, a user input means such as a keyboard, joystick, mouse, on-screen buttons or a combination of these.

The control station 31 also has a communications system 49 in order to send data to and receive data from the drone 20. The control station 31 could be a ground based system that is mounted in a maintenance vehicle, such as a type of ship known as a Service Operations Vessel.

It should be appreciated that the above description of a drone system 20 is intended as merely an example of the main components of an autonomous air vehicle and that other components may also be included in a typical system. In general, it should be noted that drones for use in the embodiments of the invention are known and are able to perform in remote control flight modes, semi- and fully-autonomous flights modes, and are able to carry out manoeuvres in a coordinated fashion in fixed positional relationship with other drones.

As described above, the invention relates to the use of a drone 20 to transport a rescue package to a location on a wind turbine that is accessible by the maintenance personnel. In this way, the rescue package can be accessed by the maintenance personnel in the event of an emergency, so there is no need for a rescue package to be a permanent fixture inside of a wind turbine nacelle.

Figure 3:
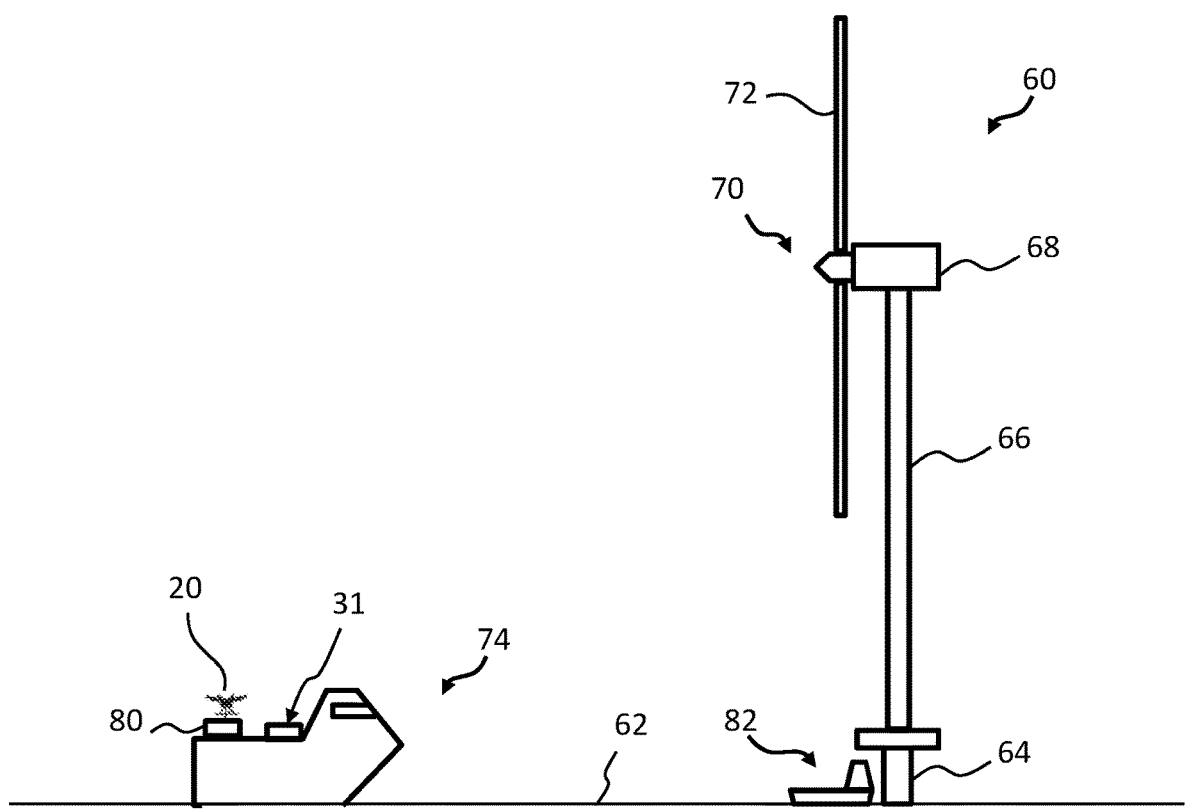
FIG. 3 is a view of a scene in which an embodiment of the invention is depicted.
Figure 4:
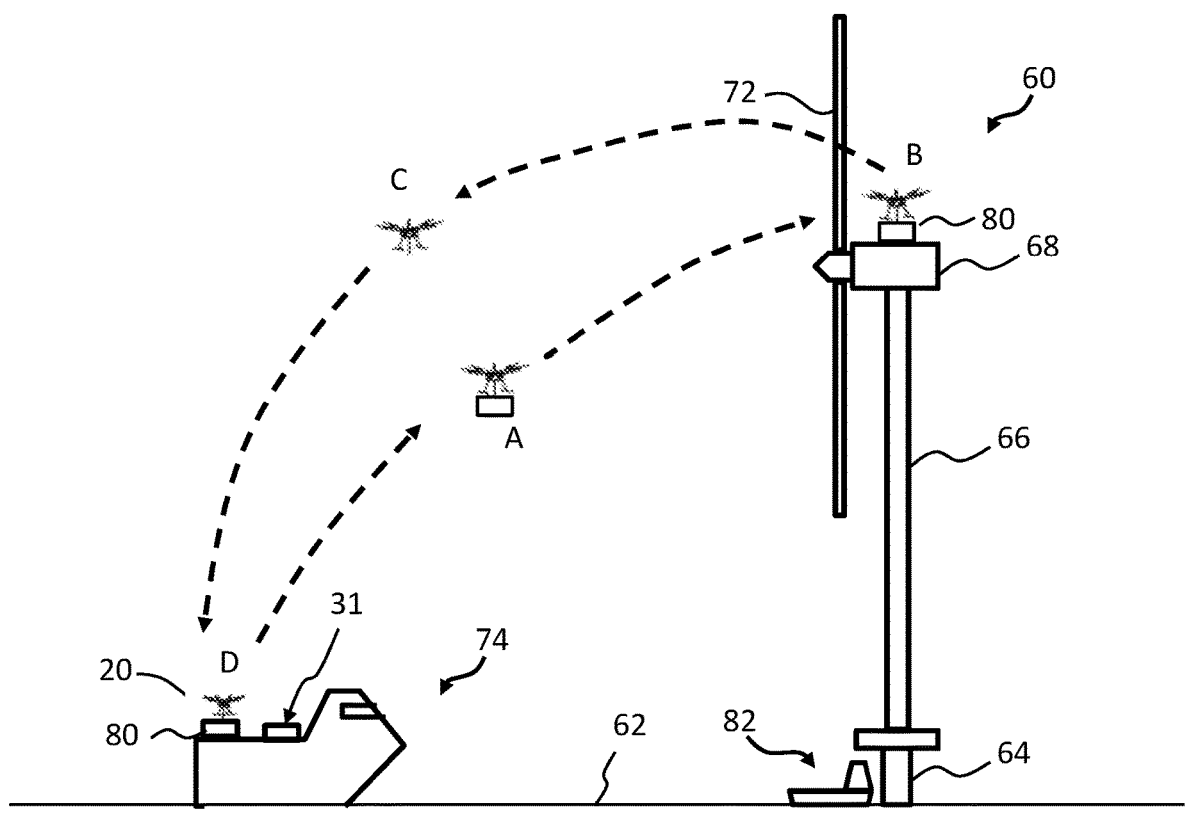
FIG. 4 is a view like that in FIG. 3, showing various stages of the invention.

FIGS. 3 and 4 demonstrate a possible operational scenario in accordance with an embodiment of the invention.

Referring firstly to FIG. 3 a wind turbine 60 is shown in an offshore location. The wind turbine 60 is supported above the sea surface 62 by a foundation 64. As is customary, the wind turbine 60 includes a tower 66 that is supported by the foundation 64, and a nacelle 68 supported on top of the tower 66. The nacelle 68 supports a rotor 70 comprising a number of blades 72. As illustrated, the wind turbine is of the type known as a horizontal-axis wind turbine, but other wind turbine types are applicable.

In the illustrated scene, the wind turbine 60 is about to undergo a maintenance operation, and so a support vessel 74, known as a Service Operations Vessel, or SOV, is standing off from the wind turbine 60 by an appropriate safe distance. The distance itself is not crucial, but is likely determined by safety requirements in the applicable geographical territory and may be in the order of around 50 m. The SOV 74 may remain at this station throughout the maintenance operation, typically by the use of a dynamic positioning system or through mooring lines.

As shown the SOV 74 serves as the maintenance base vehicle for the operation and as a launch platform for a UAV 20, which is stowed on the SOV 74. The reader should note at this point that the various parts in the drawings are not shown to scale, and so the UAV 20 is illustrated as being larger with respect to the SOV than would be the case in real life.

The UAV 20 is shown here as being positioned on a rear deck of the SOV 74. Note that this is for convenience of illustration, and it will be appreciated that the UAV 20 may be stowed appropriately in any part of the SOV 74 from which it could be launched into the air. For example, the UAV 20 may be stored in a suitable storage container (not shown) which ordinarily provides protection from the marine environment but which may be opened at the point the UAV 20 is required to be deployed.

Accompanying the UAV 20 is a control station 31, as has been described. Once again, the control station 31 is illustrated in FIG. 3 as being located on the rear deck of the SOV 74 for convenience. However, the electronic hardware of the control station 31 may instead be located in a dry control room of the SOV, or, indeed, in a storage container of the UAV 20.

The UAV 20 is associated with a payload 80 which comprises an emergency rescue package. That package may be a permanent or semi-permanent fixture to the UAV 20 so that the rescue package, in effect, forms a unitary part of the UAV 20. Alternatively, the UAV 20 may be equipped with a control hook, or a pair of grabbing jaws with which it can couple itself to the rescue package. Irrespective of what coupling means is chosen, it should be appreciated that the UAV 20 is associated with the rescue package 80 in such a way that it is able to lift it into the air and transport the rescue package 80 over to the wind turbine 60.

The rescue package 80 may include a variety of equipment that maintenance personnel, technicians or crew may require in the event of an emergency. Therefore, the rescue package 80 may include suitable equipment for tackling fires, such as breathing apparatus/respirators, fire suppression devices, first aid equipment such as first aid kits and defibrillators, and emergency evacuation equipment such as climbing systems, survival suits and life rafts. Note that such equipment is mentioned by way of example only and is not meant to be limiting.

As is shown in FIG. 3, the SOV 74 has dispatched a Crew Transfer Vessel 82 or CTV towards the wind turbine. The CTV 82 is a smaller ship more suited to manoeuvring closer to the wind turbine with the aim of transferring crew and equipment across to the wind turbine in various sea states. In some instances, the SOV 74 could serve the purpose of the CTV 82.

At this point the maintenance operation has begun. Moving on to FIG. 4, it can be seen at 'A' that the UAV 20 has been launched or deployed and is travelling to the wind turbine 60. Deployment of the UAV 20 can be initiated by a variety of actions. One option is that the UAV 20 is commanded by the control station 31 to be deployed at the start of a maintenance operation so that the rescue package 80 can be in position on the wind turbine at a suitable access point before the maintenance personnel arrive in the wind turbine 60. Such a deployment command could be triggered manually by a crew member with the responsibility of managing such a task, or it could be time triggered based on a suitable pre-programmed mission profile.

Another option is that the deployment could be triggered by the detection of an emergency event. For example, the wind turbine or the maintenance personnel could be equipped with a suitable transponder to call the UAV 20 in the event of an emergency. In response to such an emergency call, the UAV 20 would launch under the control of the control station 31 and travel directly to the wind turbine 60 to provide the personnel with the rescue package 80 as soon as possible.

The UAV 20 may be flown manually by a suitably skilled pilot using the controls at the control station 31, for example on-board the SOV 74. Alternatively the UAV 20 may be controlled automatically by the control station 31 implementing a suitable mission profile stored on it.

The UAV 20 continues to fly to the wind turbine until it is an appropriate position to place the rescue package 80 somewhere accessible. This can be seen at position 'B' in FIG. 4. Usually wind turbine nacelles have hatchways allowing personnel within the wind turbine to access the exterior of the nacelle. Therefore, one option is for the UAV to land the rescue package in close proximity to the nacelle access hatch (not shown).

A dedicated landing zone may be provided on the nacelle 68 which provides an access point for the rescue package to be accessed by personnel. This landing zone may be preselected to be accessible easily from the nacelle access hatch. The landing zone may be marked with visible indicia to assist the drone pilot in locating the landing zone and setting the UAV 20 on the zone accurately. Alternatively, the UAV 20 may be equipped with suitable hardware and control routines to recognise the landing zone and pilot itself down to the safe landing.

The landing zone may also be provided with charging means to replenish the batteries of the UAV 20 once it has landed. This may be achieved by docking with a physical charging plug, or a member of the maintenance team tasked with plugging in the UAV 20 to the power source. A further alternative would be for the landing zone to be equipped with contactless/wireless charging means so that the UAV 20 could replenish its charge simply by landing in the correct position on the landing zone.

In addition to providing the rescue package 80, it is envisaged that in some embodiments that the UAV 20 may be configured to perform a second function. For example, in the event of an emergency signal being received, the UAV 20 may take appropriate action whilst delivering the rescue package 80. One option here is if the emergency signal indicates the presence of a fire in the nacelle 68, the UAV 20 may be configured to deliver a fire extinguishing means to the nacelle. The emergency signal that causes deployment of the UAV 20 therefore acts as a triggering signal for the UAV 20 to take action to extinguish the fire. The UAV 20 may also be configured to act in response to a triggering signal which is received when the UAV 20 is already in flight, or when it is stationary having landed on the nacelle. Thus, the UAV 20 may be responsive to a triggering signal either when it is in transit, or even before it has been deployed. In this embodiment, a fire extinguishing grenade as known in the art may be dropped through the access hatch by the UAV 20. Such a device is described in WO201403238.

As has been mentioned, the risk of an emergency occurring during a maintenance operation are low, so the UAV 20 provides the rescue package 80 to the wind turbine 60 mainly as a precautionary measure. Therefore, when the maintenance operation has been completed, the UAV 20 returns the rescue package 80 to the SOV 74, as is indicated by 'C' and 'D' in FIG. 4.

Retrieval or recovery of the UAV 20 to the SOV 74 may be triggered by various actions. One option is for the maintenance crew to initiate retrieval after they have confirmed that the maintenance operation is over. The control station 31 therefore can pilot the UAV 20 back to ship automatically. Another option is for the UAV 20 to be piloted back under manual control via the control station 31 at the appropriate time.

Figure 5:
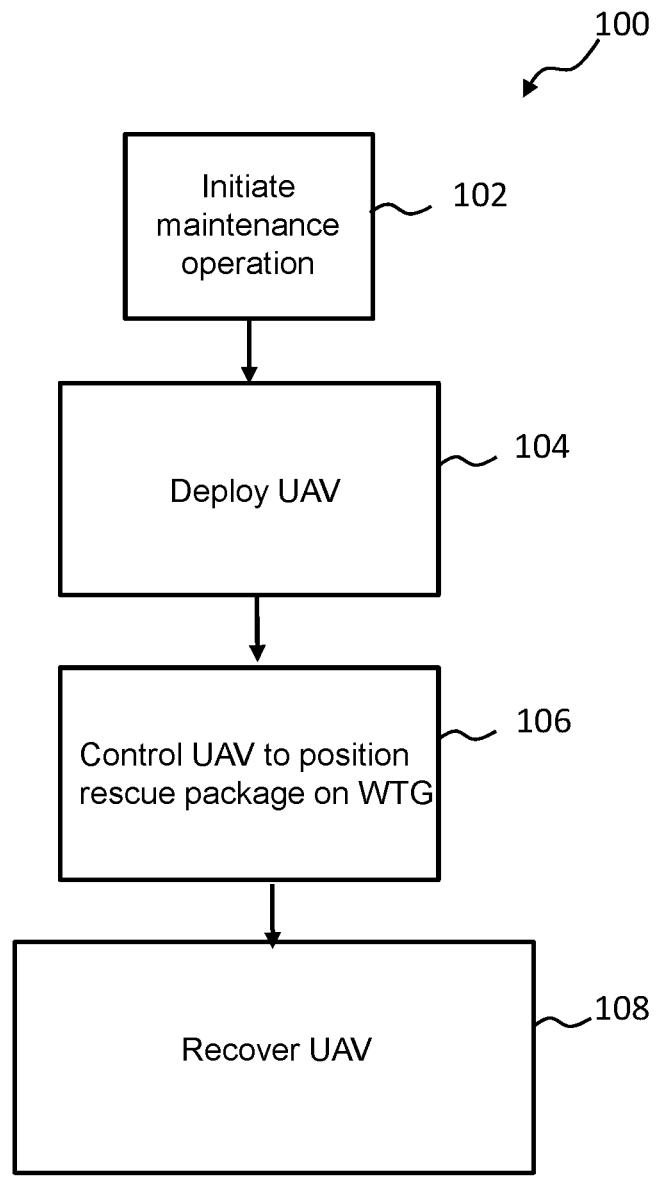
FIG. 5 is a flow chart depicting an embodiment of the invention.

FIG. 5 is a diagram illustrating steps of a method 100 for carrying out a maintenance operation on a wind turbine according to an embodiment of the invention. Some or all of the steps illustrated in the process 100 may be carried out by the control station 31, either according to a pre-planned mission or through interaction with suitably qualified operator.

Step 102 indicates that a maintenance operation has been initiated and so the control station 31 may respond by deploying the UAV 20, at step 104, which carries the rescue package 80 to the wind turbine 60. As has been mentioned, another option is for the control station 31 to dispatch the UAV 20 to the wind turbine 60 only after a deployment call has been received, for example when an emergency event has been detected.

Once the UAV 20 has been deployed, the control station 31 pilots the UAV 20 towards the wind turbine 60 therefore to land the UAV 20 on an appropriate landing zone of the wind turbine 60, as at step 106. As discussed the landing zone may be located at a suitable access point at which maintenance personnel are provided a route to access the rescue package 80.

The method further comprises, at step 108, recovering the UAV 60 back to its base once the maintenance operation has been completed. The recovery step may be triggered by the receipt of a signal or message from the maintenance team that the operation has been completed. The initiation may also be time-based.

UAV recovery may be accomplished by a pilot inputting appropriate control commands into the control station 31 and/or some or all of the piloting may be under automatic control of the control station 31.

In the above discussion of the illustrated embodiments, several modifications or variants have been mentioned. Others will now be discussed for completeness.

Although in the illustrated embodiment, a CTV is used to transfer the crew from the SOV to the wind turbine, it is envisaged that the SOV may also be suitably sized and equipped to transfer crew to the wind turbine.

Where a CTV is used, it is an option that at least one of the UAV 20 and the control station 31 may be carried on the CTV instead of the SOV. In circumstances where the SOV must remain in station a considerable distance from the wind turbine due to safety reasons, launching the UAV from the CTV may be beneficial from the point of view of conserving battery life.

In the above discussion, flight control of the UAV 20 is provided by the control station 31 which is on-board ship. However, it is envisaged that the control station may also be stored within the wind turbine 60, for example in the nacelle. In this way, the maintenance personnel may pilot the UAV to the nacelle once they are ready to begin their maintenance work. Still further, the nacelle-based control station could also be accompanied by a UAV. In this way, the maintenance personnel could fly the UAV to the SOV to pick up the rescue package when required and return it to the ship once the maintenance operation is complete.

As an alternative to this scenario, rather than being stored on the ship or the wind turbine, one or more UAVs and associated control station may instead be stored at a suitable location within the wind park, for example at a substation. The UAV would therefore be a general 'worker drone' used to ferry rescue packages between SOV and wind turbine as appropriate.

As a further alternative to the above scenarios the method and system may be performed in an on-shore wind park.

The invention claimed is:

1. A method for carrying out a maintenance operation on a wind turbine, comprising:
    stationing a maintenance vehicle proximate to the wind turbine;
    initiating the maintenance operation on the wind turbine, wherein the maintenance operation includes one or more maintenance personnel entering the wind turbine;
    deploying a UAV from the maintenance vehicle, wherein the UAV has a payload including a rescue package; and
    positioning the UAV such that the rescue package is placed on the wind turbine and accessible to the one or more maintenance personnel in or on the wind turbine.

2. The method of claim 1, wherein the UAV is positioned so as to place the rescue package at a predetermined access point on the wind turbine, and wherein the predetermined access point is accessible to the one or more maintenance personnel in or on the wind turbine.

3. The method of claim 2, wherein the predetermined access point is on a nacelle of the wind turbine.

4. The method of claim 3, wherein the predetermined access point is proximate to a hatchway of the nacelle.

5. The method of claim 1, wherein the UAV is deployed from the maintenance vehicle in response to an emergency signal.

6. The method of claim 1, wherein the UAV is configured to deploy a fire extinguishing grenade into the wind turbine in response to a triggering signal.

7. The method of claim 1, wherein the UAV returns to the maintenance vehicle without the rescue package after the rescue package has been placed on the wind turbine and before the maintenance operation is completed.

8. The method of claim 7, wherein the UAV retrieves the rescue package from the wind turbine once the maintenance operation is completed.

9. The method of claim 1, wherein the UAV remains with the rescue package during the maintenance operation and returns the rescue package to the maintenance vehicle after the maintenance operation has been completed.

10. The method of claim 1, wherein the rescue package may comprise one or more of an offshore survival suit, safety descent kit, climbing equipment, fire extinguisher, breathing equipment, fire protection clothing, nutrition packages.

11. The method of claim 1, wherein the maintenance vehicle comprises a ship.

12. The method of claim 1, wherein prior to the step of positioning the UAV, the wind turbine does not contain any rescue package.

13. The method of claim 1, wherein the rescue package includes equipment for use by the one or more maintenance personnel to fight a fire.

14. The method of claim 13, wherein the rescue package includes at least one item selected from group consisting of: a fire extinguisher, fire protection clothing, and a breathing apparatus or respirator.

15. The method of claim 1, wherein the rescue package includes equipment for use by the one or more maintenance personnel to evacuate the wind turbine.

16. The method of claim 15, wherein the rescue package includes at least one item selected from the group consisting of: a safety descent kit, climbing equipment, and a life raft.

17. The method of claim 1, wherein the rescue package includes survival equipment for use by the one or more maintenance personnel.

18. The method of claim 17, wherein the rescue package includes at least one item selected from the group consisting of: an offshore survival suit, a nutrition package, and a life raft.

19. A system for providing operational equipment at a predetermined position, the system comprising:
    a maintenance vehicle carrying a UAV with an associated payload comprising a rescue package; and
    a control station configured to: deploy the UAV before or during a maintenance operation, direct the UAV to a wind turbine on which the maintenance is carried out, and position the UAV with respect to the wind turbine so that the rescue package is placed thereon and is accessible to one or more maintenance personnel in or on the wind turbine,
    wherein the maintenance operation includes the one or more maintenance personnel entering the wind turbine.

20. The system of claim 19, wherein the control station is configured to place the UAV at a predetermined access point of the wind turbine and wherein the predetermined access point is accessible to the one or more maintenance personnel in or on the wind turbine.

21. The system of claim 19, wherein the control station is configured to deploy the UAV from the maintenance vehicle in response to an emergency signal.

22. The system of claim 19, wherein the control station is configured to return the UAV to the maintenance vehicle without the rescue package after the rescue package has been placed on the wind turbine and before the maintenance operation is completed.

23. The system of claim 22, wherein the control station is configured to control the UAV to retrieve the rescue package from the wind turbine once the maintenance operation has been completed.

24. The system of claim 19, wherein the control station is configured to control the UAV such that it remains with the rescue package during the maintenance operation and returns the rescue package to the maintenance vehicle after the maintenance operation has been completed.

25. The system of claim 19, wherein the control station is configured to control the UAV such that it deploys a fire extinguishing grenade into the wind turbine in response to a triggering signal.

26. A method for carrying out a maintenance operation on a wind turbine, comprising:
    stationing a maintenance vehicle proximate to the wind turbine;
    initiating the maintenance operation on the wind turbine, wherein the maintenance operation includes one or more maintenance personnel entering the wind turbine;
    deploying a UAV from the maintenance vehicle, wherein the UAV is deployed from the maintenance vehicle in response to initiation of the maintenance operation, and wherein the UAV has a payload including a rescue package; and
    positioning the UAV such that the rescue package is placed on the wind turbine and accessible to the one or more maintenance personnel in or on the wind turbine.

27. A system for providing operational equipment at a predetermined position, the system comprising:

a maintenance vehicle carrying a UAV with an associated payload comprising a rescue package; and a control station configured to: deploy the UAV before or during a maintenance operation, direct the UAV to a wind turbine on which the maintenance is carried out, and position the UAV with respect to the wind turbine so that the rescue package is placed thereon and is accessible to one or more maintenance personnel in or on the wind turbine, wherein the control station is configured to deploy the UAV from the maintenance vehicle in response to initiation of a maintenance event, and wherein the maintenance operation includes the one or more maintenance personnel entering the wind turbine.

* * * * *